United States Patent
Chana et al.

(10) Patent No.: US 9,836,382 B2
(45) Date of Patent: Dec. 5, 2017

(54) COGNITIVE PLATFORM FOR TROUBLESHOOTING SYSTEM EVENTS

(71) Applicant: International Business Machines Corporation, Armonk, NY (US)

(72) Inventors: Mandeep Chana, Berkshire (GB); William King, London (GB); Tomyo G. Maeshiro, Denton, TX (US); Mathews Thomas, Flower Mound, TX (US); Janki Y. Vora, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 15/046,440

(22) Filed: Feb. 17, 2016

(65) Prior Publication Data

US 2017/0235660 A1   Aug. 17, 2017

(51) Int. Cl.
*G06F 11/36* (2006.01)
*G06F 17/30* (2006.01)

(52) U.S. Cl.
CPC ........ *G06F 11/366* (2013.01); *G06F 11/3692* (2013.01); *G06F 17/30598* (2013.01)

(58) Field of Classification Search
CPC .............. G06F 11/366; G06F 11/3692; G06F 11/3664; G06F 11/0781; G06F 11/0793; G06F 11/079; G06F 11/0709; G06F 17/30598; G06F 17/30241; G06F 17/30528; G06F 11/3688; G06F 11/2294; G06F 11/3051

See application file for complete search history.

(56) References Cited

U.S. PATENT DOCUMENTS

| | | | | |
|---|---|---|---|---|
| 7,055,136 B2* | 5/2006 | Dzoba | ................... | G06F 11/362 714/E11.207 |
| 7,757,217 B2* | 7/2010 | Sivaram | ................ | G06F 11/362 714/38.1 |
| 8,595,561 B1* | 11/2013 | Lu | ..................... | G01R 31/31705 714/25 |
| 8,688,910 B2* | 4/2014 | Moyer | ................ | G06F 12/0831 711/118 |

(Continued)

OTHER PUBLICATIONS

Kobayashi, et al., "Towards an NLP-Based Log Template Generation Algorithm for System Log Analysis," CFI, 2014, NY, NY.

*Primary Examiner* — Nadeem Iqbal
(74) *Attorney, Agent, or Firm* — Steven M. Greenberg, Esq.; CRGO Law

(57) ABSTRACT

A method for the cognitive debugging of a managed system includes first receiving an event in an event management system. Thereafter, a context for the event is extracted therefrom and the context is mapped to both one or more components of a managed computing system and also one or more corresponding debug mode commands for each of the components. Consequently, a debug mode is enabled in each of the components and the corresponding debug mode commands are issued for each of the components so as to provoke a generation of one or more log entries. The generated log entries then are matched to a pre-stored log entry amongst a multiplicity of pre-stored log entries and at least one problem resolution document stored in connection with the matched pre-stored log entry is transmitted to an operator of the event management system.

18 Claims, 2 Drawing Sheets

(56) References Cited

U.S. PATENT DOCUMENTS

| | | | |
|---|---|---|---|
| 2006/0041866 A1* | 2/2006 | Sivaram | G06F 11/362 717/124 |
| 2012/0143893 A1* | 6/2012 | Abraham | G06F 11/3476 707/769 |
| 2012/0284699 A1* | 11/2012 | Van Der Merwe | G06F 11/3636 717/129 |
| 2013/0097589 A1* | 4/2013 | Bates | G06F 11/3664 717/125 |
| 2017/0118041 A1* | 4/2017 | Bhattacharya | H04L 12/462 |

* cited by examiner

COGNITIVE PLATFORM FOR TROUBLESHOOTING SYSTEM EVENTS

BACKGROUND OF THE INVENTION

Field of the Invention

The present invention relates to managed systems management and more particularly to log file analysis during managed systems management.

Description of the Related Art

Managed systems refer to the remote management of an aggregation of different components of a computing system including one or more different servers, routers and switches and the different computer programs that operate therein. Remote management involves the monitoring of the operational state of each component of the computing system, the detection of one or more faults in one or more of these components and the diagnosis of a cause for each fault and potentially a remedy for each fault. Central to remote management, then, is the utilization of log file analysis with respect to each monitored component of the computing system.

Log file analysis generally involves the invocation of a resource consumptive debug mode in selected components of a managed system and the parsing of different log entries in different log files of different components of a managed system resulting from the debug mode. The analysis of the log file involves reading into memory entries of a log file for various monitored operational parameters of a monitored component and the detection of one or more anomalies therein. Based upon the nature of a detected anomaly in a log file, a table or rule may be consulted mapping to the nature of the detected anomaly so as to produce a recommended action requisite to remediating a fault resultant from the detected anomaly. In most instances, much of the foregoing process is a manual process heavily dependent upon the specific knowledge of the end user analyzing the log file.

In this regard, once an anomaly has been detected by way of a particular log for a corresponding particular component of a managed system, a manual process of component diagnostics ensues. A manually intensive process, component diagnostics ordinarily involves the remote invocation by a skilled individual of a sequence of different debug mode commands and the interpretation of the result of each different component command. The result received for each debut mode command then is compared by the skilled individual to an expected result so as to properly identify the root cause of a fault within the particular component.

As it will be understood, then, in a managed system of many different components of a disparate nature, many different skilled individuals are required to properly diagnose all components of the managed system excepting for the instance where one individual possesses a universal expert understanding of all components of the managed system—a rarity at best. More importantly, given the consumptive nature of the use of a debug mode, a strategic and, by definition, limited use of debug mode is desired.

BRIEF SUMMARY OF THE INVENTION

Embodiments of the present invention address deficiencies of the art in respect to managed system management and provide a novel and non-obvious method, system and computer program product for the cognitive debugging of a managed system. In an embodiment of the invention, a method for the invention includes first receiving an event in an event management system. Thereafter, a context for the event is extracted therefrom and the context is mapped to both one or more components of a managed computing system and also one or more corresponding debug mode commands for each of the components. Consequently, a debug mode is enabled in each of the components and the corresponding debug mode commands are issued for each of the components so as to provoke a generation of one or more log entries. The generated log entries then are matched to a pre-stored log entry amongst a multiplicity of pre-stored log entries and at least one problem resolution document stored in connection with the matched pre-stored log entry is transmitted to an operator of the event management system.

In one aspect of the embodiment, the debug mode is disable in each of the components responsive to the receipt of the generated one or more log entries. In another aspect of the embodiment, the context of the event is a vendor associated with a particular one of one or more components. In yet another aspect of the embodiment, the problem resolution document is a trouble ticket previously received in connection with the matched pre-stored log entry. In even yet another aspect of the embodiment, the generated log entries are matched to a pre-stored log entry amongst the multiplicity of pre-stored log entries through an agglomerative clustering based upon a string similarity function, whereby like log entries are clustered into groups. Finally, in yet another aspect of the embodiment, one or more queries of the one or more log entries are generated and displayed to the operator of the event based upon the context of the event.

In another embodiment of the invention, a managed system management data processing system is configured for the cognitive debugging of a managed system. The managed system management data processing system includes an event management system executing in memory of a host computing system that includes one or more computers each with memory and at least one processor. The event management system additionally is coupled to a multiplicity of components of a managed system. Of import, a cognitive system logging platform module is coupled to the event management system and also executes in the memory of the host computing platform.

During execution, program code of the module responds to a receipt of an event from the event management system by initially extracting a context for the event and by mapping the context to one or more of the multiplicity of components of the managed computing system and one or more corresponding debug mode commands for each of the one or more components. Subsequently, the program code enables debug mode in each of the one or more components and issues the one or more corresponding debug mode commands for each of the one or more components to provoke a generation of one or more log entries. Thereafter, the program code matches one of the generated one or more log entries to a pre-stored log entry amongst a multiplicity of pre-stored log entries and transmits to an operator of the event management system at least one problem resolution document stored in connection with the matched pre-stored log entry.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the cognitive debugging of a managed system. In accordance with an embodiment of the invention, an event, otherwise known as an alert, is detected in an event management system managing a managed computing system. In response to the receipt of the event, a context of the event is determined from the event and mapped to a selection of one or more components of the managed computing system for which debug mode is to be enabled. Thereafter, debug mode is enabled in the mapped selection of the one or more components and one or more debug commands issued in the mapped selection of the one or more components. Both the activation of the debug mode and the issuance of the debug commands in turn provokes the generation of one or more log entries for each of the components. The generated log entries are then compared to a set of previously stored log entries in order to identify one or more comparable log entries, and one or more problem resolution documents resulting from the comparable log entries are provided to an operator of the event management system. In this way, a cognitively likely resolution to the detected event is provided to a singular operator while employing a strategic and therefore limited utilization of debug mode in the components of the managed system.

Figure 1:
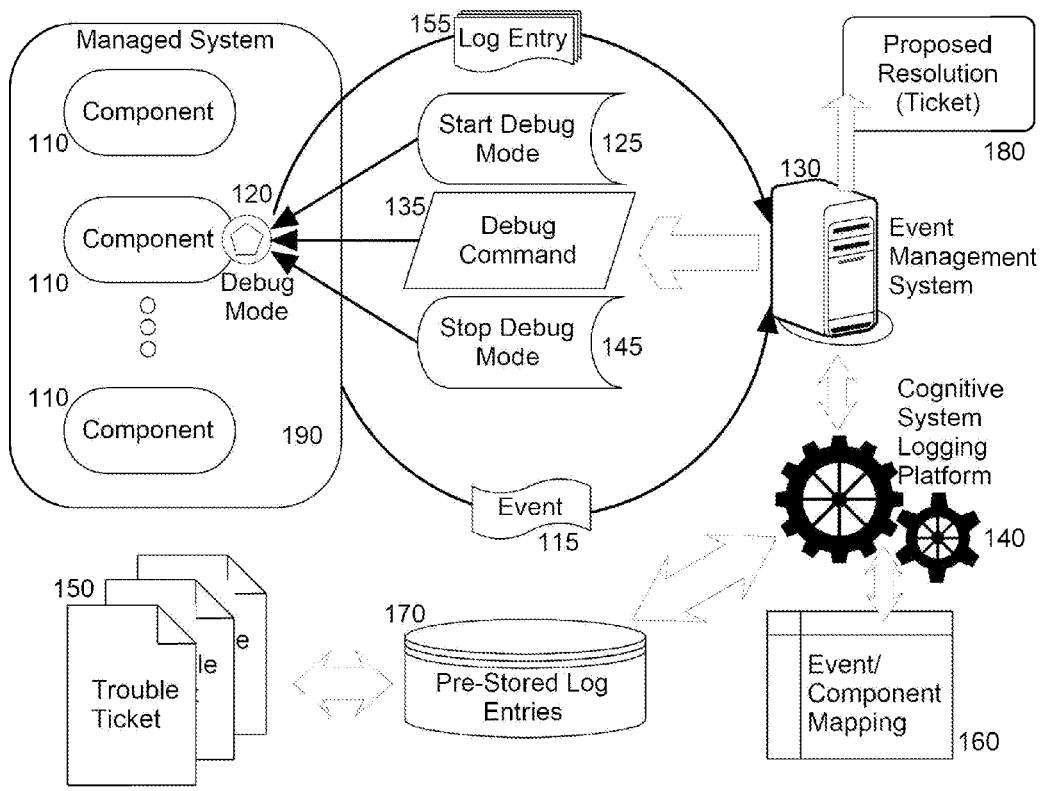
FIG. 1 is a pictorial illustration of a process for the cognitive debugging of a managed system.

In further illustration, FIG. 1 pictorially shows a process for the cognitive debugging of a managed system. As shown in FIG. 1, an event management system 130 monitors a managed system 190 that includes different components 110, including physical components such as different computing devices, storage devices, routers, switches and the like, and also including logical components such as application servers, Web servers, database management servers and other computer programs. An event 115 is received in the event management system 130 in connection with the managed system 190 and stored in a table providing for each event, a perceived severity of the event 115, a summary of the nature of the event 115, a time and/or date of occurrence of the event 115, an identity of a particular one of the components 110 for which the event 115 pertains, and addressing information for the particular one of the components 110 as well as other relevant addressing information. Thereafter, the event 115 is provided to a cognitive system logging platform 140. The cognitive system logging platform 140 in turn locates a mapping 160 for the event 115 to one or more of the components 110 that are to be diagnosed through debugging based upon the information for the event 115 stored in the table.

With respect to the mapping 160, the cognitive system logging platform 140 instructs the event management system 130 to transmit a directive 125 to activate a debug mode 120 in one or more of the components 110 indicated by the mapping 160 and also to issue one or more debug commands 135 in connection with the debug mode 120. In response, different log entries 155 are received in the event management system 130. Specifically, the different log entries 155 are produced not only in consequence of merely having activated the debug mode 120, but also in consequence of the debug comments 135. Subsequent to the production of the log entries 155, a directive 145 is transmitted to deactivate the debug mode 120 so as to avoid unnecessary resource consumption caused by the continuous use of the debug mode 120. The event management system 130 then provides the log entries 150 to the cognitive system logging platform 140 for further analysis.

In this regard, the cognitive system logging platform 140 compares the log entries 155 to a selection of pre-stored log entries 170 in order to identify one or more similar log entries. The comparison, for instance, may be the result of a fuzzy matching of each of the log entries 155 to the pre-stored log entries 170 that may be organized in clustered groupings according to common topics. Once identified, corresponding problem resolution documentation 150, such as a particular trouble ticket previously associated with a similar pre-stored log entry is returned by the cognitive system logging platform 140 to the event management system 130 as a prospective resolution 180 to the event 115. The event management system 130 in turn either transmits as a message or displays in a console the prospective resolution 180. As well, the event management system 130 generates one or more queries to be performed with respect to the log entries 155 and displays in the console the generated queries so as to suggest to an end user an effective log entry query for locating the prospective resolution 180.

Figure 2:
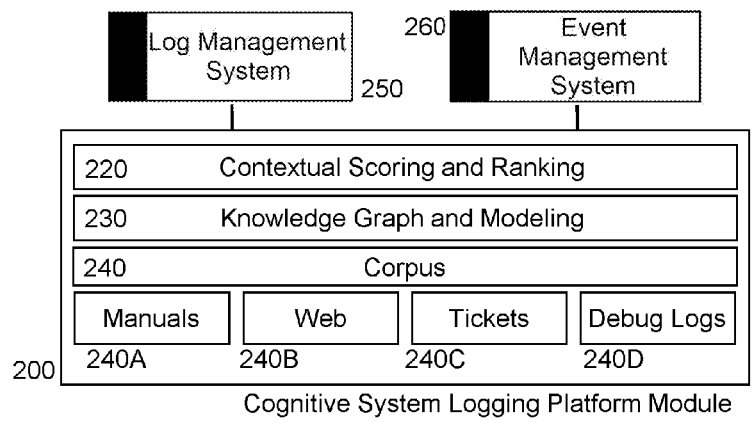
FIG. 2 is a schematic illustration of a managed system management data processing system configured for the cognitive debugging of a managed system; and, FIG. 3 is a timing diagram illustrating a process for the cognitive debugging of a managed system.

The process described in connection with FIG. 1 is implemented in a managed system management data processing system. In further illustration, FIG. 2 schematically shows a managed system management data processing system configured for the cognitive debugging of a managed system. The system includes a log management system 250, an event management system 260 and a cognitive system logging platform module 200, each executing in memory of a corresponding host computing system including one or more computers, each with memory and at least one processor. The log management system 250 manages the receipt and processing of log entries from different components of a communicatively coupled managed system whereas the event management system 260 receives and responds to events emanating from the communicatively coupled managed system.

Of note, the cognitive system logging platform module 200 provides for the cognitive debugging of the managed system. The cognitive system logging platform module 200 includes a corpus 240 of different problem resolution documents. The different problem resolution documents of the corpus 240 include electronic manuals 240A stored in connection with different components of the managed system, Web sourced information 240B pertaining to the different components and different faults arising within the different components, previously received and processed trouble tickets 240C pertaining to the different faults arising within the different components, and previously received log entries 240D from different debugging sessions with different components in the managed system. In so far as each of the documents of the corpus 240 are stored as unstructured data, each of the documents of the corpus 240 may be annotated with meta-data stored as structured data such that any association between a particular pre-stored log entry and a document of the corpus 240 may be defined in terms of an association between a pre-stored log entry and the structured annotation of the corresponding document of the corpus 240.

The cognitive system logging platform module 200 also includes a knowledge graph and modeling portion 230. The knowledge graph and modeling portion 230 receives log entries in response to different debug commands directed to selected ones of the components and utilizes the received log entries to identify documents and data in the corpus 240 relevant to resolving an alert associated with the selected ones of the components. The knowledge graph and modeling portion 230 organizes the identified documents within a knowledge graph so as to facilitate the location of relevant ones of the identified documents responsive to different ad hoc queries pertaining to a particular fault in one of the components. The cognitive system logging platform module 200 yet further includes a contextual scoring and ranking portion 220. The contextual scoring and ranking portion 220 targets different components of the managed system for logging dependent upon the nature of a received event or alert, and also generates different queries of a set of resultant log entries from the logging dependent upon the nature of the received event or alert.

Figure 3:
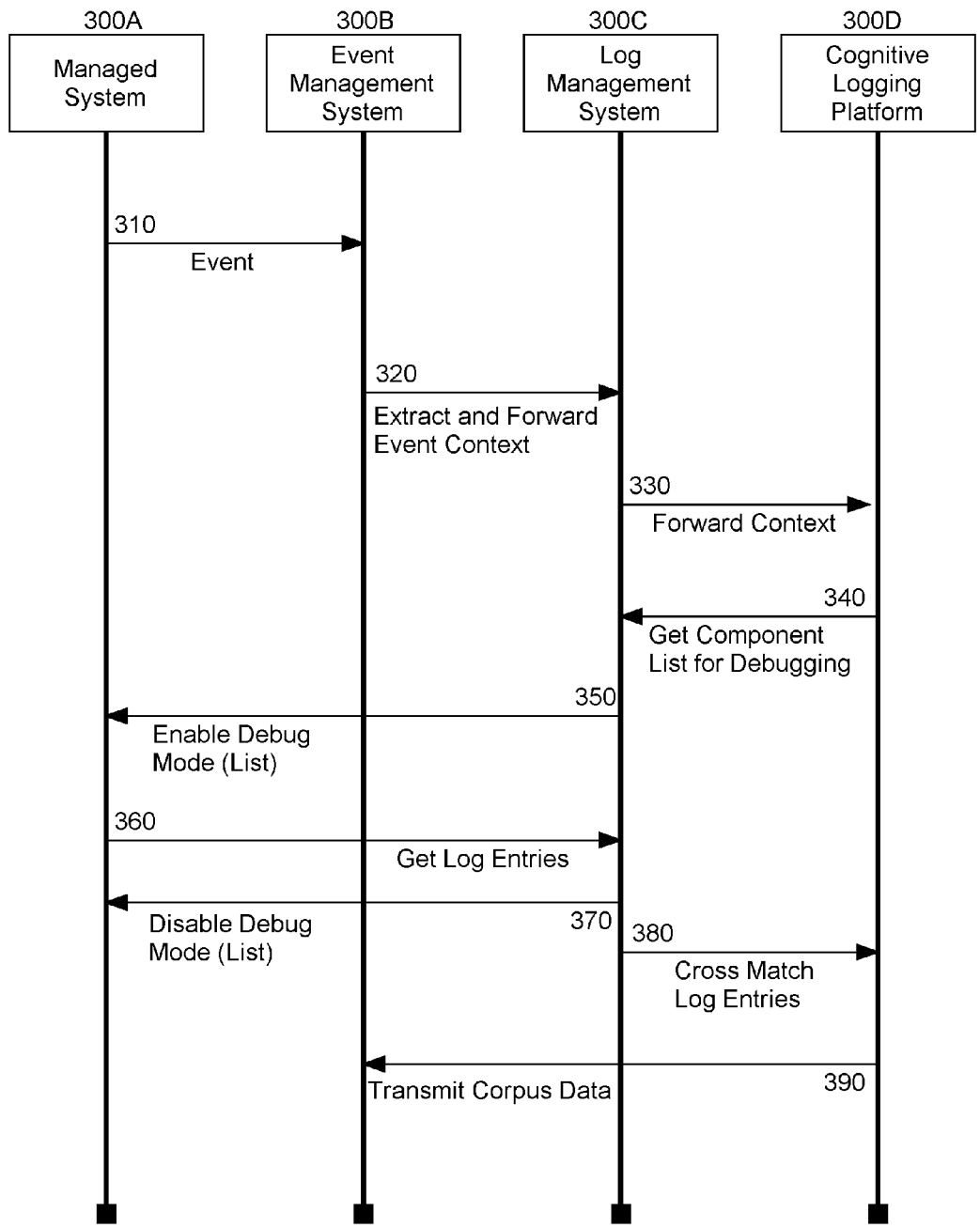

In even yet further illustration of the operation of the managed system management data processing system, FIG. 3 is a timing diagram illustrating a process for the cognitive debugging of a managed system. As shown in FIG. 3, in step 310 an event from the managed system 300A is received in the event management system 300B. In response, in step 320 a context for the event is extracted from the event and forwarded from the event management system 300B to the log management system 300C. In step 330, the log management system 300C forwards the extracted context to the cognitive logging platform 300D.

In step 340, the cognitive logging platform 300D identifies one or more components of the managed system 300A for which debug mode is to be enabled and, as such, a list of those components are provided to the log management system 300C. The log management system 300C in turn enables debug mode in each component of the managed system 300A in the list and directs one or more debug commands to the components of the managed system 300A. In response, different log entries 360 are received in the log management system 300C from the components of the managed system 300A. Thereafter, in step 370 the log management system 300C disables the previously enabled debug mode in each of the components of the list and in step 380 the retrieved log entries are provided to the cognitive logging platform 300D.

The cognitive logging platform 300D in turn fuzzy matches the retrieved log entries to one or more pre-stored log entries and retrieves based thereon, corpus data associated with the matched pre-stored log entries. Specifically, the cognitive logging platform 300D fuzzy matches the retrieved log entries to the one or more pre-stored log entries through the use of agglomerative clustering based upon a string similarity function, affinity propagation, or other such clustering technique in which like log entries are clustered into groups. Finally, in block 390 the cognitive logging platform 300D transmits the corpus data to the event management system 300B for review by an operator of the event management system 300B.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for the cognitive debugging of a managed system comprising:
   receiving an event in an event management system executing in memory of a host computing system comprising one or more computers each with memory and at least one processor;
   extracting a context for the event from the event and mapping the context to one or more components of a managed computing system and one or more corresponding debug mode commands for each of the one or more components;
   enabling debug mode in each of the one or more components and issuing the one or more corresponding debug mode commands for each of the one or more components to provoke a generation of one or more log entries;
   matching one of the generated one or more log entries to a pre-stored log entry amongst a multiplicity of pre-stored log entries; and,
   transmitting to an operator of the event management system at least one problem resolution document stored in connection with the matched pre-stored log entry.

2. The method of claim 1, further comprising disabling debug mode in each of the one or more components responsive to the receipt of the generated one or more log entries.

3. The method of claim 1, wherein the context of the event is a vendor associated with a particular one of one or more components.

4. The method of claim 1, wherein the problem resolution document is a trouble ticket previously received in connection with the matched pre-stored log entry.

5. The method of claim 1, wherein the generated one or more log entries are matched to a pre-stored log entry amongst the multiplicity of pre-stored log entries through clustering, whereby like log entries are clustered into groups.

6. The method of claim 1, wherein one or more queries of the one or more log entries are generated and displayed to the operator of the event based upon the context of the event.

7. A managed system management data processing system configured for the cognitive debugging of a managed system, the managed system management data processing system comprising:
   an event management system executing in memory of a host computing system comprising one or more computers each with memory and at least one processor, the event management system being coupled to a multiplicity of components of a managed system; and,
   a cognitive system logging platform module coupled to the event management system, the module comprising program code executing in the memory of the host computing platform and, during execution, responding to a receipt of an event from the event management system by extracting a context for the event and mapping the context to one or more of the multiplicity of components of the managed computing system and one or more corresponding debug mode commands for each of the one or more components by enabling debug mode in each of the one or more components and issuing the one or more corresponding debug mode commands for each of the one or more components to provoke a generation of one or more log entries, by matching one of the generated one or more log entries to a pre-stored log entry amongst a multiplicity of pre-stored log entries and by transmitting to an operator of the event management system at least one problem resolution document stored in connection with the matched pre-stored log entry.

8. The system of claim 7, wherein the program code of the module additionally disables debug mode in each of the one or more components responsive to the receipt of the generated one or more log entries.

9. The system of claim 7, wherein the context of the event is a vendor associated with a particular one of one or more components.

10. The system of claim 7, wherein the problem resolution document is a trouble ticket previously received in connection with the matched pre-stored log entry.

11. The system of claim 7, wherein the generated one or more log entries are matched to a pre-stored log entry amongst the multiplicity of pre-stored log entries through an agglomerative clustering based upon a string similarity function, whereby like log entries are clustered into groups.

12. The system of claim 7, wherein one or more queries of the one or more log entries are generated and displayed to the operator of the event based upon the context of the event.

13. A computer program product for the cognitive debugging of a managed system, the computer program product comprising a computer readable storage medium having program instructions embodied therewith, the program instructions executable by a device to cause the device to perform a method comprising:
   receiving an event in an event management system executing in memory of a host computing system comprising one or more computers each with memory and at least one processor;
   extracting a context for the event from the event and mapping the context to one or more components of a managed computing system and one or more corresponding debug mode commands for each of the one or more components;
   enabling debug mode in each of the one or more components and issuing the one or more corresponding debug mode commands for each of the one or more components to provoke a generation of one or more log entries;
   matching one of the generated one or more log entries to a pre-stored log entry amongst a multiplicity of pre-stored log entries; and,
   transmitting to an operator of the event management system at least one problem resolution document stored in connection with the matched pre-stored log entry.

14. The computer program product of claim 13, wherein the method further comprises disabling debug mode in each of the one or more components responsive to the receipt of the generated one or more log entries.

15. The computer program product of claim 13, wherein the context of the event is a vendor associated with a particular one of one or more components.

16. The computer program product of claim 13, wherein the problem resolution document is a trouble ticket previously received in connection with the matched pre-stored log entry.

17. The computer program product of claim 13, wherein the generated one or more log entries are matched to a pre-stored log entry amongst the multiplicity of pre-stored log entries through an agglomerative clustering based upon a string similarity function, whereby like log entries are clustered into groups.

18. The computer program product of claim 13, wherein one or more queries of the one or more log entries are generated and displayed to the operator of the event based upon the context of the event.

* * * * *